United States Patent
Gonzaga et al.

(10) Patent No.: US 10,377,193 B2
(45) Date of Patent: Aug. 13, 2019

(54) GROUP FOR BEAD RELEASING A TYRED WHEEL AND/OR FOR THRUSTING A PORTION OF A TYRE OF A TYRED WHEEL

(71) Applicant: Butler Engineering and Marketing S.p.A., Rolo (Reggio Emilia) (IT)

(72) Inventors: Tullio Gonzaga, Correggio (IT); Silvano Santi, Imola (IT)

(73) Assignee: BUTLER ENGINEERING AND MARKETING S.P.A., Rolo (Reggio Emilia) (IT)

( * ) Notice: Subject to any disclaimer, the term of this patent is extended or adjusted under 35 U.S.C. 154(b) by 117 days.

(21) Appl. No.: 15/643,755

(22) Filed: Jul. 7, 2017

(65) Prior Publication Data

US 2018/0009277 A1 Jan. 11, 2018

(30) Foreign Application Priority Data

Jul. 8, 2016 (IT) .................. 102016000071778

(51) Int. Cl.
   *B60C 25/138* (2006.01)
   *B60B 30/08* (2006.01)
   *B60C 25/05* (2006.01)

(52) U.S. Cl.
   CPC ............ *B60C 25/138* (2013.01); *B60B 30/08* (2013.01); *B60C 25/059* (2013.01); *B60C 25/0527* (2013.01); *B60C 25/0545* (2013.01); *B60C 25/0551* (2013.01)

(58) Field of Classification Search
   CPC . B60B 25/138; B60C 25/0527; B60C 25/059; B60C 25/0551

USPC ........................................................ 157/1.17
See application file for complete search history.

(56) References Cited

U.S. PATENT DOCUMENTS

| | | | | |
|---|---|---|---|---|
| 3,231,001 A * | 1/1966 | Dragoo | ................ | B60C 25/132 157/1.17 |
| 3,807,477 A * | 4/1974 | Curtis | .................. | B60C 25/132 157/1.24 |
| 3,827,474 A * | 8/1974 | Besuden | ............... | B60C 25/132 157/1.28 |
| 3,958,618 A * | 5/1976 | Reuther | ................ | B60C 25/132 157/1.2 |
| 4,047,553 A * | 9/1977 | Kotila | ................... | B60C 25/132 157/1.24 |
| 4,168,733 A * | 9/1979 | Gwaltney | ............. | B60C 25/132 157/1.28 |
| 4,222,426 A * | 9/1980 | Brosene, Jr. | .......... | B60C 25/025 157/1.28 |
| 4,335,772 A * | 6/1982 | Bubik | ................... | B60C 25/132 157/1.28 |
| 6,109,327 A | 8/2000 | Gonzaga | | |

(Continued)

FOREIGN PATENT DOCUMENTS

| | | | | |
|---|---|---|---|---|
| EP | 1714807 | 10/2006 | | |
| EP | 2514612 A1 * | 10/2012 | ......... | B60C 25/0557 |

(Continued)

*Primary Examiner* — George B Nguyen
(74) *Attorney, Agent, or Firm* — Tutunjian & Bitetto, P.C.

(57) ABSTRACT

The present invention regards a group for bead releasing a tyred wheel and/or for thrusting a portion of a tyre (T) of a tyred wheel (TW), and such group comprises a base, a supporting column rising from the base, a tool-supporting arm extending from the supporting column and a bead releasing and/or thrust tool supported by the tool-supporting arm.

25 Claims, 9 Drawing Sheets

(56) References Cited

U.S. PATENT DOCUMENTS

| | | | | |
|---|---|---|---|---|
| 6,443,206 | B1 * | 9/2002 | Bonacini | B60C 25/132 157/1.24 |
| 7,343,955 | B2 * | 3/2008 | Cunningham | B60C 25/135 157/1.17 |
| 7,438,109 | B2 * | 10/2008 | Cunningham | B60C 25/138 157/1.24 |
| 8,985,178 | B1 * | 3/2015 | Vaninger | B60C 25/13 157/1.1 |
| 9,073,394 | B1 * | 7/2015 | Clasquin | B60C 25/056 |
| 9,434,219 | B1 * | 9/2016 | Clasquin | B60C 25/0548 |
| 2001/0042601 | A1 * | 11/2001 | Corghi | B60C 25/0545 157/1.26 |
| 2010/0051206 | A1 * | 3/2010 | Lawson | B60C 25/0515 157/1.17 |
| 2010/0065224 | A1 * | 3/2010 | Ferrari | B60C 25/138 157/1.17 |
| 2011/0100558 | A1 * | 5/2011 | Corghi | B60C 25/056 157/1.1 |
| 2011/0155329 | A1 * | 6/2011 | Magnani | B60C 25/138 157/1.17 |
| 2011/0226050 | A1 * | 9/2011 | Nakayama | G01M 17/021 73/146 |
| 2013/0206341 | A1 * | 8/2013 | Ferrari | B60C 25/138 157/1.17 |
| 2014/0000813 | A1 * | 1/2014 | Story | B60C 25/0593 157/1.24 |
| 2014/0048216 | A1 * | 2/2014 | Lundberg | B60C 25/12 157/1.17 |
| 2015/0047789 | A1 * | 2/2015 | Davis | B60C 25/13 157/1.17 |
| 2016/0075195 | A1 * | 3/2016 | Bonacini | B60C 25/0551 157/1.17 |

FOREIGN PATENT DOCUMENTS

| | | |
|---|---|---|
| EP | 2524821 | 11/2012 |
| EP | 2875969 | 5/2015 |

* cited by examiner

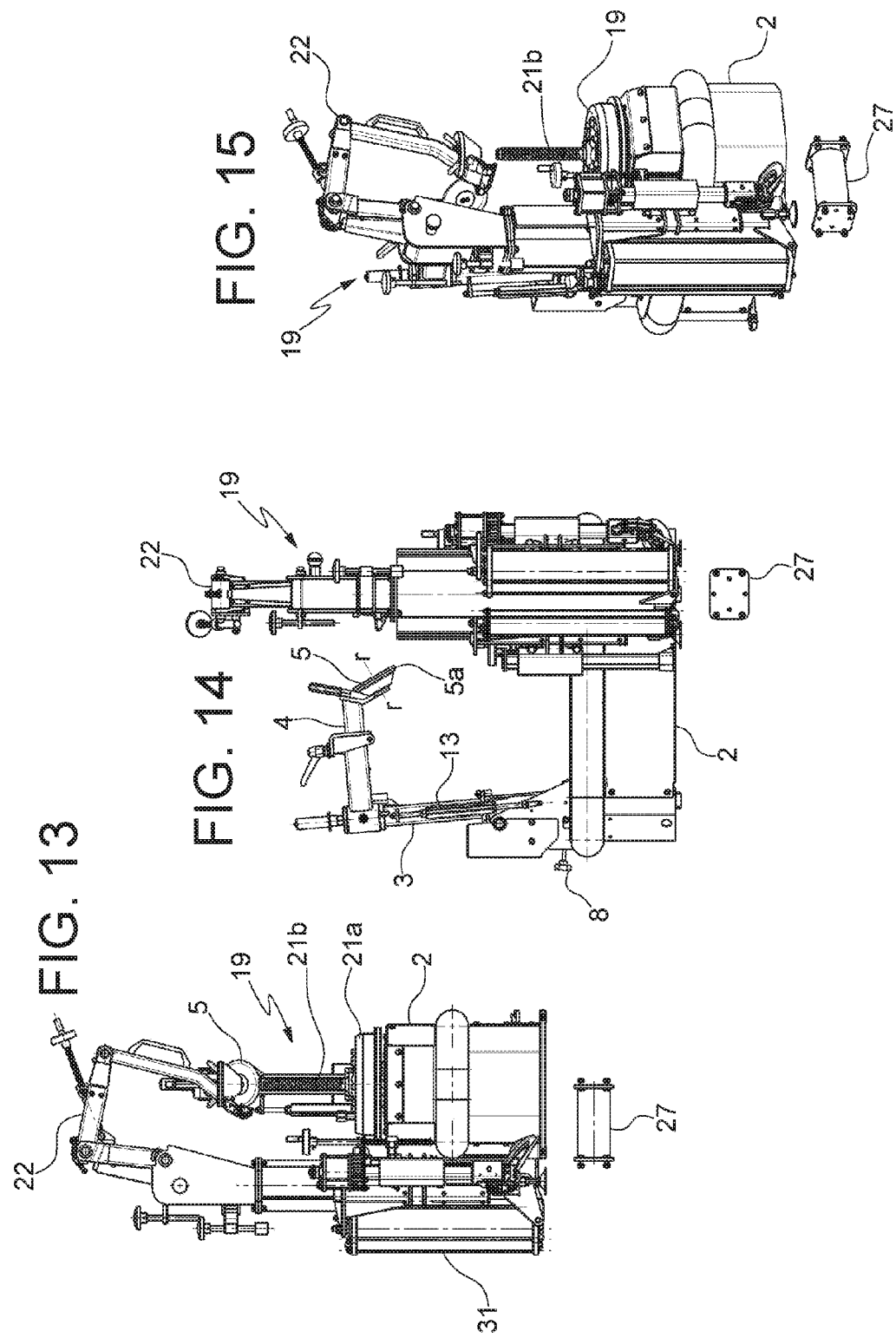

GROUP FOR BEAD RELEASING A TYRED WHEEL AND/OR FOR THRUSTING A PORTION OF A TYRE OF A TYRED WHEEL

TECHNICAL FIELD OF THE INVENTION

The present invention regards a group for bead releasing a tyred wheel and/or for thrusting a portion of a tyre of a tyred wheel as well as a machine for mounting and/or dismounting a tyre on/from a rim.

STATE OF THE PRIOR ART

Up to now, many machines have been proposed for treating tyres which have one or more tools for bead releasing, dismounting or mounting.

U.S. Pat. No. 6,109,327A, for example, teaches a tyre mounting-dismounting machine provided with a supporting cone for a rim of a tyred wheel, as well as with a supporting column for a pair of bead releasing rollers. A lower bead releasing roller is then provided.

Such machine, even if it allows suitably dismounting a tyred wheel, does not ensure a simple and quick treatment of a large quantity of wheels, in particular of front or rear wheels of vehicles or of different wheels. This can be useful in particular when it is necessary to prepare racing wheels for a series of vehicles which must be used during a motor race.

In addition, sometimes there are sensors in the wheels, e.g. pressure sensors, so that it is opportune to suitably control the advancing stroke or path of the tools.

SUMMARY OF THE INVENTION

One object of the present invention is to provide a new group for bead releasing a tyred wheel and/or for thrusting a portion of a tyre of a tyred wheel.

Another object of the present invention is to provide a group like the aforesaid that ensures quickly and correctly treating wheels of different size.

Another object of the present invention is to provide a new group as indicated above which is quickly adaptable to sequentially treating wheels of different size.

Another object of the present invention is to provide a new machine for mounting and/or dismounting a tyre on/from a rim.

Another object of the present invention is to provide a new machine like the aforesaid which is capable of correctly and quickly executing operations for treating a tyred wheel or components thereof.

In accordance with one aspect of the invention, a group is provided according to the present application.

In accordance with one aspect of the invention, a machine is provided according to the present application.

The present specification refers to preferred and advantageous embodiments of the invention.

BRIEF DESCRIPTION OF THE DRAWINGS

Other characteristics and advantages of the invention will be clearer from the description of one embodiment of a group and of a machine, illustrated by way of example in the enclosed drawings, in which:

FIGS. 13 to 15 are respectively side, rear and slightly top perspective views of a machine according to the present invention with column in a transport and storage approached configuration.

In the enclosed drawings, equivalent parts or components are marked with the same reference numbers.

DETAILED DESCRIPTION OF THE INVENTION

Figure 1:
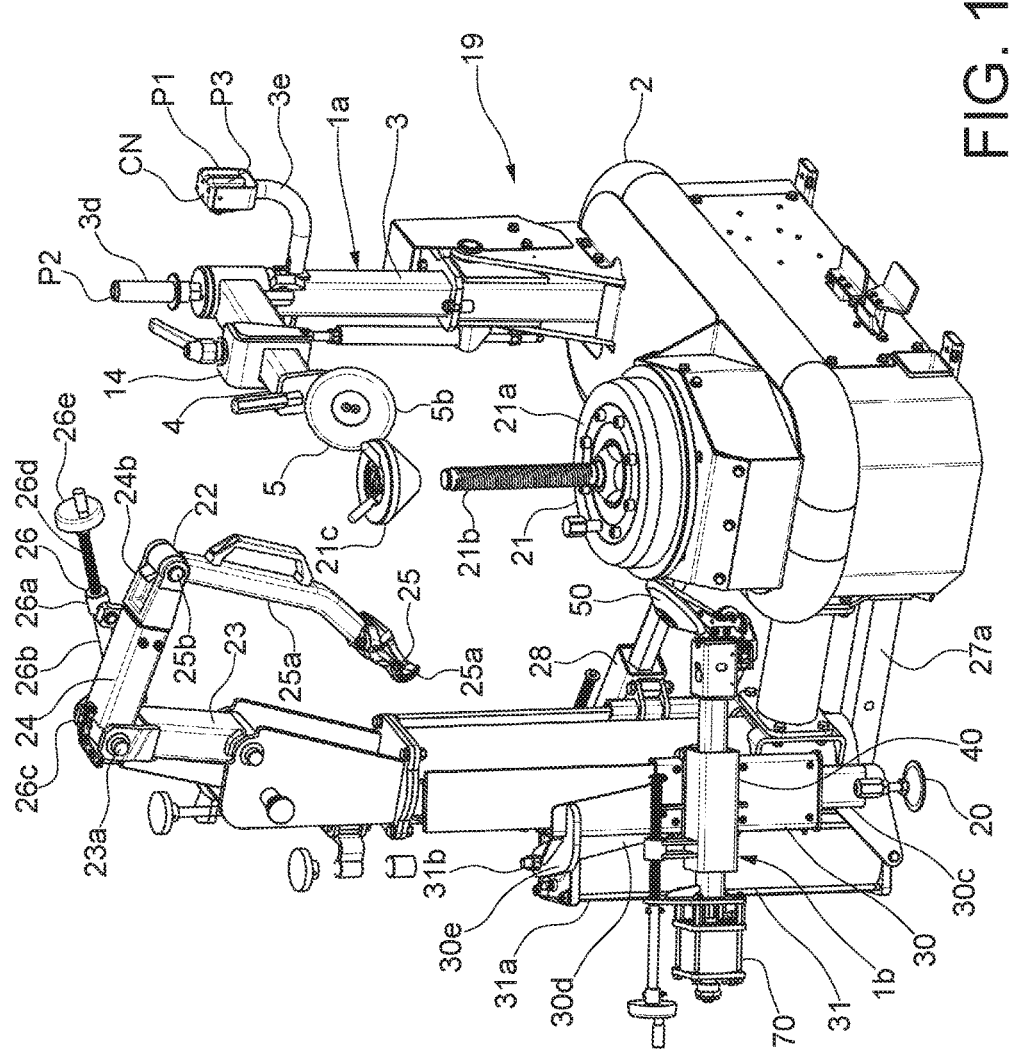
FIG. 1 is a top perspective view of groups and of a machine according to the present invention.
Figure 2:
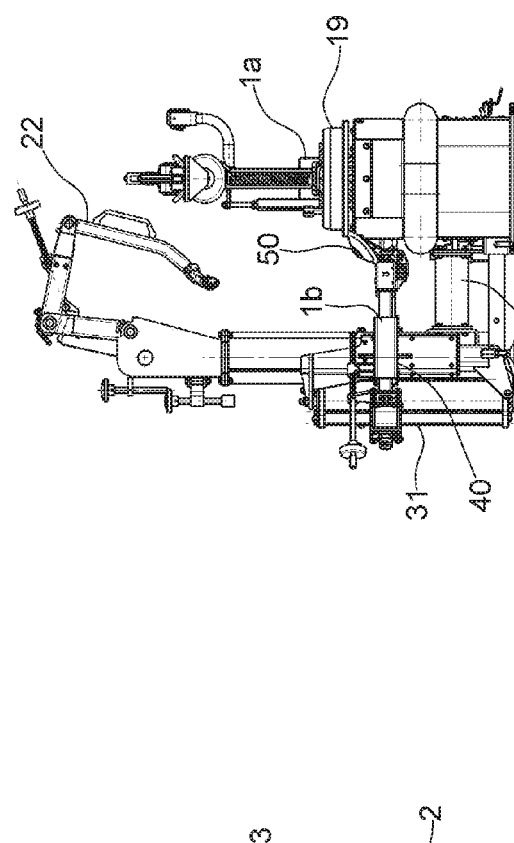
FIGS. 2 to 4 are respectively front, side and top views of the groups and of the machine of FIG. 1.
Figure 4:
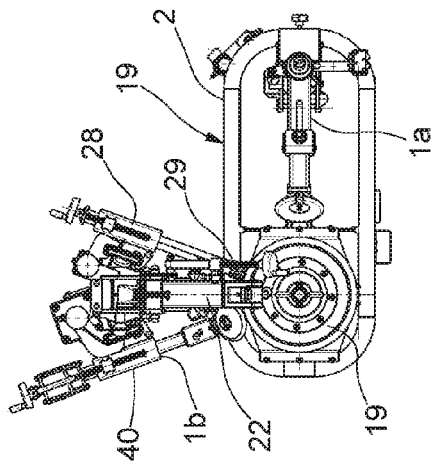
Figure 3:
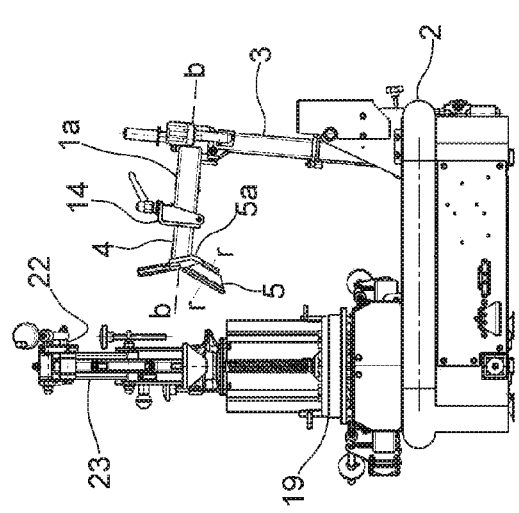
Figure 5:
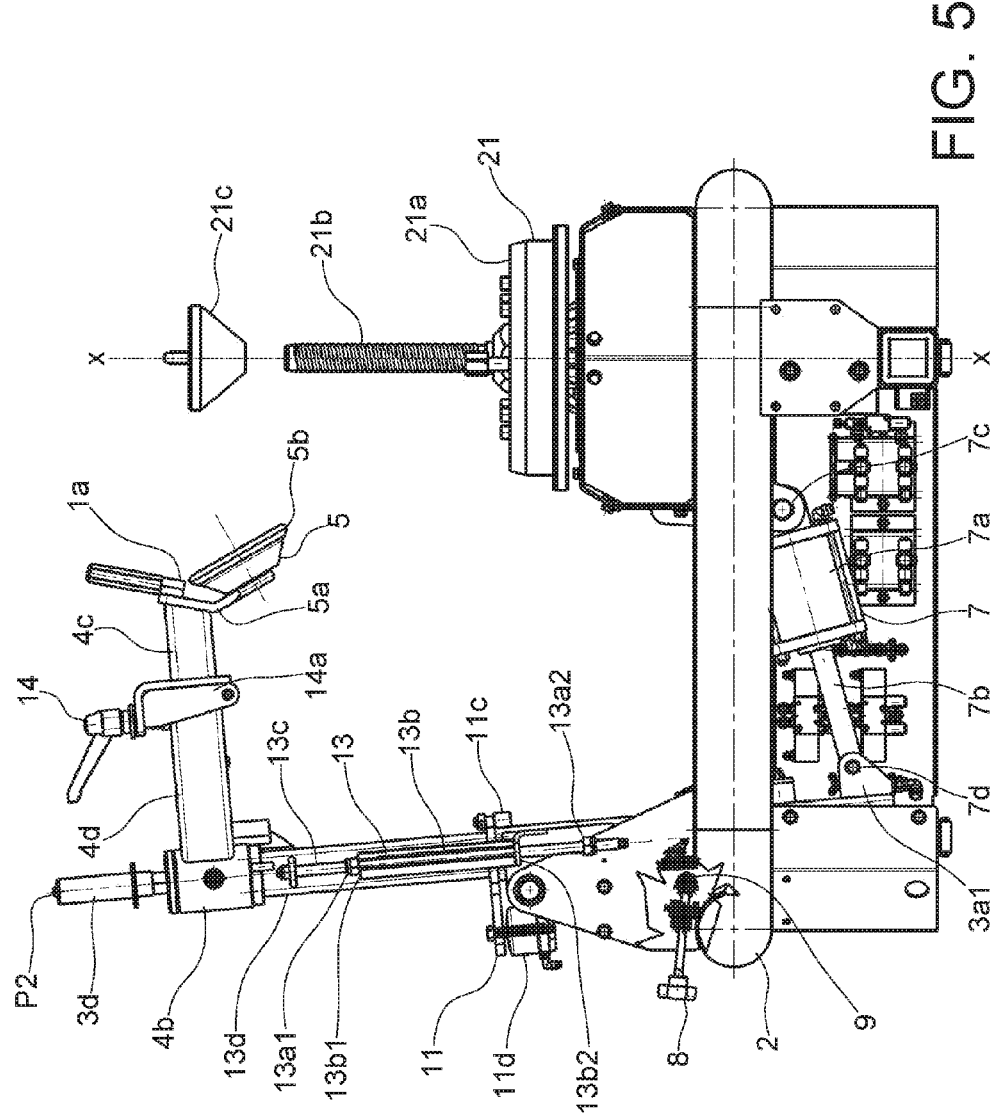
FIG. 5 is a sectional view with transparent parts of the groups and of the machine of FIG. 1.
Figure 6:
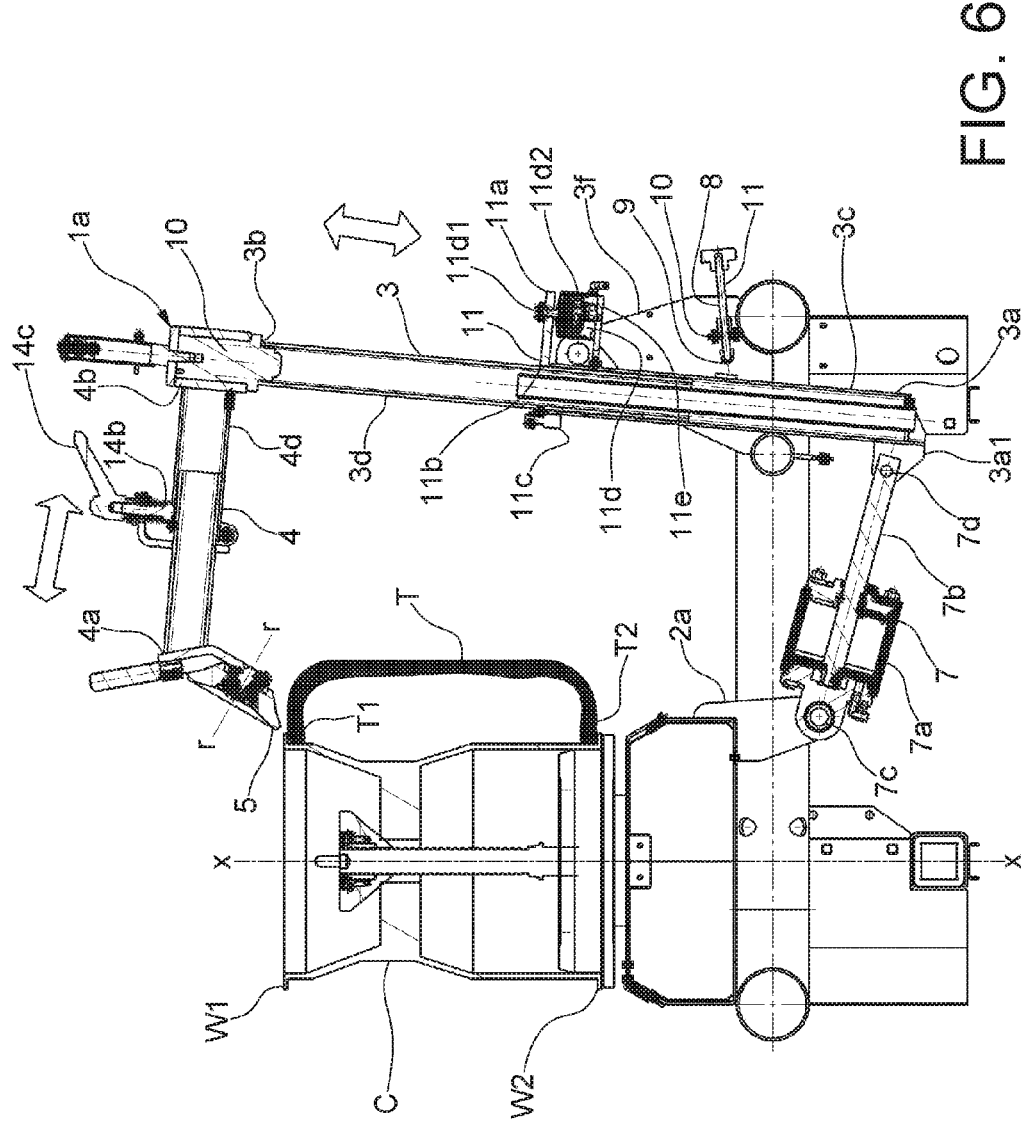
FIGS. 6 and 7 illustrate respective steps for releasing an upper bead, upper during use, of a tyre of a tyred wheel with a group according to the present invention.

With reference first of all to FIGS. 1 to 7, a group or first group 1a is illustrated for bead releasing a tyred wheel and/or for thrusting a portion of a tyre of a tyred wheel, and such group 1a comprises a base 2, a supporting column or first column 3 rising from the base 2, a tool-supporting arm or first tool-supporting arm 4 extending from the supporting column 3 as well as a bead releasing and/or thrust tool or first bead releasing and/or thrust tool 5 supported by the tool-supporting arm 4.

The tool 5 can be a bead releasing roller, e.g. with frustoconical configuration, if desired mounted rotatably idle or motorized around an axis r-r (see FIG. 2) that is substantially transverse or tilted by about 30°-60°, if desired about 45° with respect to the main longitudinal axis or extension b-b of the respective arm 4. If desired, the bead releasing roller 5 is rotatably mounted on a respective appendage 5a rising from the tool-supporting arm 4 and fixed thereto, if desired removably.

In the present patent application, where it is indicated that two components are fixed, it is intended that a first component is connected to a second component without such components being able to move with respect to each other, and this can be obtained by means of welding, screws, bolts, glue or similar elements.

In addition, where it is indicated that two components are integral, it is intended that a first component is connected to a second component, if desired by means of interposition of other components of the group or of the machine, and in a manner such that by moving one of such components in a first direction, one also moves the other component in such first direction, but by moving in another or second direction or by rotating one of the two components, such movement is not imparted or in any case cannot be imparted to the other component.

Preferably, during the bead releasing operations, when the roller 5 is in contact with a portion of a bead, this will be dragged into rotation around the axis r-r relative to the arm 4 or, if provided, to the respective appendage 5a via friction contact with the bead of the tyre.

In addition, the tool 5 can have a first working or operating side 5b, i.e. the portion which, during use and—if the roller is rotatable—each time and during the rotation of the roller 5, comes into contact with a portion of the bead of the tyre, with the working or operating side preferably directed downward; in substance, the group 1a is set for releasing the upper bead of a tyre, even if it could also be mounted in a manner so as to act from bottom to top in order to release the lower bead of a tyre and with working side directed upward.

Such bead releasing tool 5 preferably carries out the function of bead releasing, i.e. detaching a circumferential bead T1 or a portion thereof from a respective edge W1 of the rim W or from an edge portion, before dismounting the bead T1, i.e. before the bead T1 is brought outside the channel C of the rim W beyond the respective edge W1, that is into the zone outside that delimited between two circumferential edges W1, W2 of the rim W.

In addition or as an alternative to such function, the thrust tool 5 carries out the function of assisting a mounting tool, i.e. it cooperates with a mounting tool to insert a circumferential bead T1 or a portion thereof within the channel C of the rim W, i.e. in the zone delimited between two circumferential edges W1, W2 of the rim. In substance, for mounting, while the mounting tool (for example as described below or another type) grasps a portion of a first bead T1 of a tyre T and drives it within the channel of the rim, i.e. in the zone delimited between two circumferential edges of the rim, the thrust tool 5 operates simultaneously with the mounting tool on a portion of the first bead angularly spaced from the operating zone of the mounting tool and assists the mounting tool in guiding the entire first circumferential bead T1 within the channel of the rim.

In addition, the first column 3 is movably mounted on the base 2 and/or the first tool-supporting arm 4 is movably mounted on the first column 3.

The group also comprises actuation means or first actuation means 7 arranged to move the column 3 with respect to the base 2 or the tool-supporting arm 4 or a segment thereof with respect to the supporting column 3, in a manner such to move the tool-supporting arm 4 between a first resting or working trim (see FIG. 6) and a second working trim (see FIG. 7), such that the bead releasing and/or thrust tool 5 is moved between a first resting position (see FIG. 6) or first working position and a second working position (see FIG. 7), and in such second position the bead releasing tool 5 is inserted between a portion of a first bead T1, e.g. upper during use, of a tyre T and a portion of a respective first edge W1, e.g. upper during use, of a rim W or it pushes a portion of a first bead T1, e.g. upper during use, of tyre T downward or in any case in the direction of the second edge W2 of the rim.

If desired, the supporting column 3 is pivoted to the base 2 and the actuation means 7 comprise means for the angular movement of the column 3 with respect to the base 2. More particularly, according to the embodiment illustrated in the figures, the first actuation means comprise a first actuator 7, e.g. hydraulic, electric or pneumatic, if desired double-acting, e.g. having a cylinder 7a and a stem 7b that can be inserted in/removed from the cylinder 7a, with the cylinder 7a or the stem 7b fixed or pivoted by means of a first pin 7c to the base 2 or to a projecting portion 2a thereof or of another base, e.g. around a horizontal axis, and the other from among the stem 7b and the cylinder 7a pivoted by means of a second pin 7d to the column 3, e.g. around a horizontal axis or in any case an axis parallel to the base pivoting axis of the other component of the first actuator, if desired at one end, lower 3a thereof during use, or at a bracket-like component 3a1 fixed or connected or integral therewith.

Figure 7:
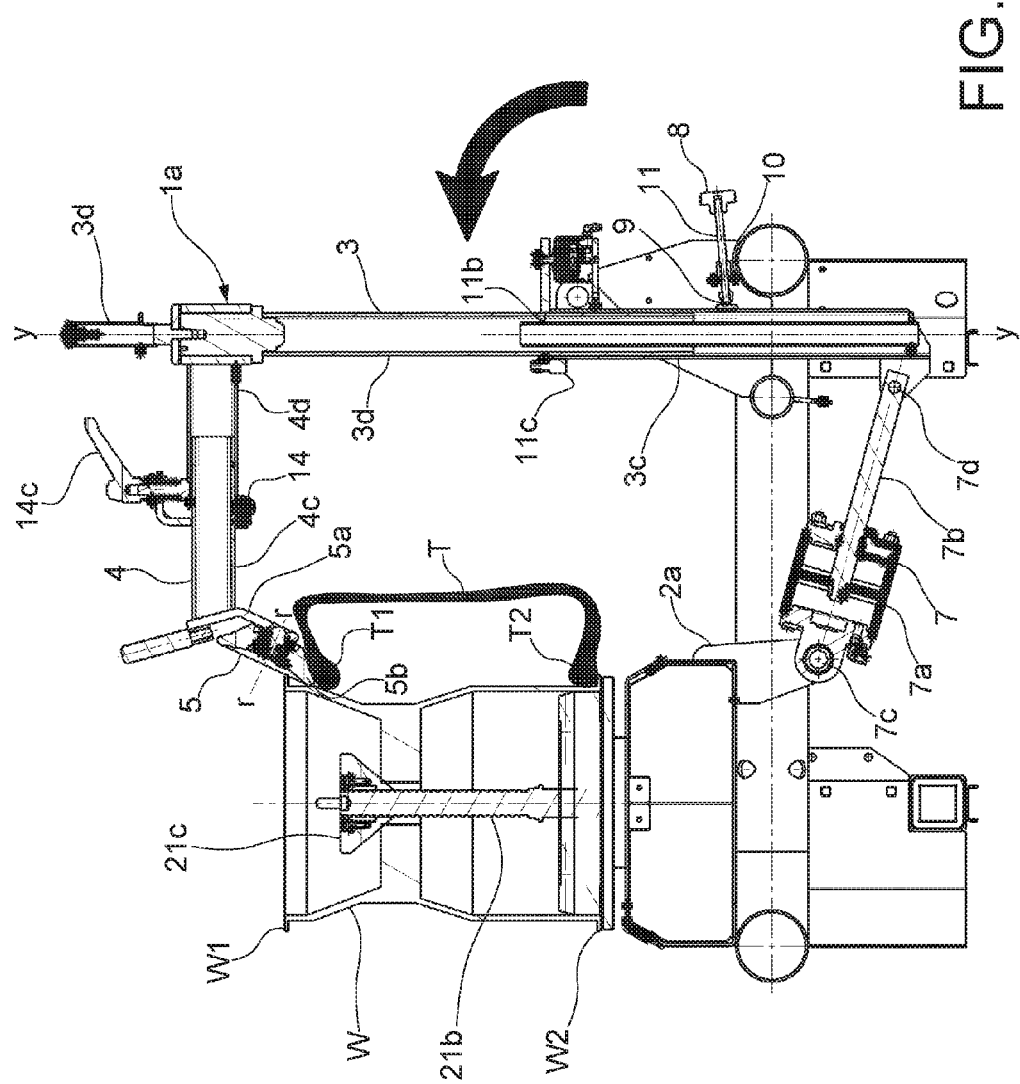
Figure 8:
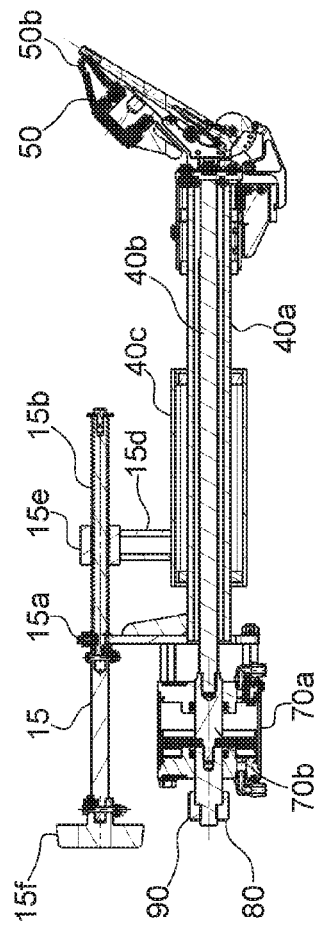
FIGS. 8 to 10 are side views with sectional parts of the components of a bead releasing and/or thrusting group of FIG. 1.

The group 1a is then provided with adjusting means or first means 8 for adjusting or increasing and decreasing the advancing stroke of the first tool-supporting arm 4 or of a segment thereof between the first and second working trim, set to adjustably vary the placement of the tool 5 in the second working position (see FIG. 7). In substance, during use, the first adjusting means are set to increase or decrease the approaching of the tool 5 to the rotation or symmetry axis x-x of a rim W and of a wheel TW or in any case to the axis of support and constrain means (which will be described hereinbelow) for a rim, so as to increase or decrease the insertion of the tool between a bead of a tyre and an edge of a rim.

The first adjusting means 8 can have automatic or manual actuation.

Preferably, the first adjusting means 8 include a locking or stopping or buffer-like component 9 arranged to abut against the first column 3, against the first arm 4 or against a component integral with or fixed thereto, when the first arm 4 is moved into the second working trim, thus preventing the further movement of the first arm 4 and hence of the tool 5 by the actuation means 7 beyond the second working trim.

Alternatively, the locking or stopping component is integral with the column or with the arm or with a segment thereof and is set to abut against another component of the group or against another segment of the arm, when the arm or a segment thereof is moved into the second working trim (such variant will be described hereinbelow), thus preventing the further movement of the first arm and hence of the tool by the actuation means beyond the second working trim.

More particularly, if a locking or stopping component 9 is provided, the same is movable and removably lockable in at least one first back positioning, in which the locking or stopping component 9 sets or determines at least one first advancing stroke and then sets or determines at least one first placement of the tool 5 in the second working position and at least one second advanced positioning, in which the locking or stopping component 9 sets or determines at least one second advancing stroke and then sets or determines at least one second placement of the tool 5 in the second working position.

Clearly, the second advancing stroke is different from the first stroke, while the second working position is different from the first working position.

In the second placement, the tool 5 or better yet the respective working or operating side 5b will be closer to or further away from the rotation or symmetry axis x-x of a rim W and of a wheel TW or in any case to/from the symmetry axis and, if desired, rotation axis for support and constrain means (described hereinbelow) for a rim.

Clearly, the first adjusting means 8 and, if provided, the locking or stopping component 9 do not intervene when the tool-supporting arm 4 is in the first resting or working trim (see FIG. 6) or the bead releasing and/or thrust tool 5 is in the first resting or working position, so that, with reference to the illustrated embodiment, the locking or stopping or buffer-like component 9 does not abut against the first column 3, against the first arm 4 or against a component integral with or fixed to the same, when the first arm 4 is in the first resting position.

Advantageously, the locking or stopping component 9 is movable and removably lockable in a plurality of operating positions so as to set or determine, in each of such operating positions, a respective advancing stroke and a respective placement of the tool 5 in the second working position, and one selects the operating position to be used each time as a function, in particular, of the rim of the wheel to be treated or better yet of the respective size.

If desired, the group or better yet the first adjusting means 8 include at least one gripper or pinion or nut or annular or spline or pin component 10, if desired delimiting a seat, e.g. internally threaded, fixed to or integral with the base 2 or with the column 3 as well as a sheet component, a rod-like component, e.g. threaded 11, or a component with rack mounted, for example, via screwing or clamping engagement with or within the gripper or pinion or nut or annular or spline or pin component 10 and, if desired, provided with actuation handle 11a. In such case, the locking or stopping or buffer-like component 9 is delimited by or fixed to one end of the rod 11, if desired threaded, such that by controlling the rotation (in the case of thread) of the rod 11 or in any case by moving it or making it slide after having released the gripper component 10 and then once again clamping the gripper component, the movement of the stopping component 9 is controlled between the first back positioning and the second advanced positioning.

According to the non-limiting embodiment illustrated in the figures, the gripper or pinion or nut or annular or spline component 10 is fixed to a projecting plate or between two projecting plates 3f of the column 3, e.g. projecting from the first length 3c thereof, lower during use.

Still according to the non-limiting embodiment illustrated in the figures, the locking or stopping or buffer-like component 9 is set to abut against a portion, e.g. lower portion of the first column 3, if desired against the first lower length 3c thereof.

With reference to the non-limiting embodiment illustrated in the figures, by driving the screwing of the threaded rod 11, the advancing stroke of the arm 4 is reduced, while by unscrewing the threaded rod 11, the advancing stroke of the arm 4 is increased.

The first tool-supporting arm 4 can be pivoted to the supporting column 3 around a vertical axis y-y, such that it is possible to impart, to the first arm 4, waving or approaching-moving apart movements with respect to the respective working zone, e.g. between 45° and 135°, if desired about 90°. For such purpose, according to the non-limiting embodiment illustrated in the figures, at a first end 4a of the first arm 4, the bead releasing and/or thrust tool 5 is fixed or pivoted, while the second end 4b of the arm is rotatably mounted on or around a second end 3b, upper during use, of the column 3 or on a block or cap component 10 engaged in a second hollow end 3b. More particularly, the second end 4b can be configured as a sleeve in a single piece or integral with one section 4d of the arm 4.

Advantageously, the first column 3 comprises a first telescopic unit with a first length, lower during use 3c, if desired tubular and a second length, upper during use 3d, if desired tubular, slidably mounted, enclosing, inside or alongside with respect to the first length 3c, e.g. partially enclosing the first length 3d.

In such case, the group 1a can include first means for locking-releasing 11 in position the first length 3c with respect to the second length 3d set to allow the locking in position of the second length 3d with respect to the first length 3c in at least one first working configuration that is retracted or lowered and at least one second working configuration that is extended or raised.

According to the non-limiting embodiment illustrated in the figures, the first locking-releasing means 11 comprise a plate 11a delimiting a first opening 11b, e.g. with square or rectangular or polygonal or circular section, in which the second length 3d is slidably mounted, if desired with square or rectangular or polygonal or circular section; the first opening 11b clearly has section greater than the second length 3d. The plate 11a is also, at one end thereof, fixed or constrained to the first length 3c, if desired by means of a screw, bolt, rivet or pawl 11c, while at another end thereof the stem 11d1 or the cylinder 11d2 of a second actuator 11d, for example hydraulic, electric or pneumatic, is engaged and connected or fixed; the other from among the cylinder 11d2 and the stem 11d1 is supported by a projecting bracket 11e fixed or removably connected to the first length 3c.

With one such structure, by driving the actuator 11d one determines the movement or tilt of the plate 11a between a first release position of the second length 3d, in which the internal edge of the plate 11a delimiting the first opening 11b is not in contact with the second length 3d and hence does not obstruct the sliding thereof, and a second locking position of the second length 3d, in which the internal edge of the plate 11a delimiting the first opening 11b is in contact with or abuts against the second length 3d and hence obstructs the sliding thereof.

If desired, the group 1a is also provided with first end-of-stroke means 13 (see in particular FIG. 5), if desired adjustable, of the movement of the second length 3d with respect to the first length 3c, set to define the level or height or extension with respect to the first length 3c of the second length 3d in the first retracted or lowered working configuration and/or in the at least one second extended or raised working configuration.

According to the non-limiting embodiment illustrated in the figures, the first end-of-stroke means 13 comprise an abutting component 13a1, 13a2 fixed to or integral with the second length 3d, a ledge component 13b fixed to or integral with the first length 3c and set to abut against the abutting component 13a when the second length 3d is moved into the first retracted or lowered working configuration or into the second extended or raised working configuration.

If desired, the first end-of-stroke means 13 comprise a threaded rod 13c fixed or constrained or integral with the second length 3d, while the abutting component 13a1, 13a2 comprises an internally threaded ring nut mounted in screwing engagement on the threaded rod 13c. As a variant, the threaded bar could be fixed or constrained or integral with the first length 3c, and in such case the abutting component would comprise an internally threaded ring nut. Alternatively, the first end-of-stroke means could include a bar or the like, also not threaded, on which abutting components are gripped or removably constrained.

With regard instead to the ledge component 13b, according to the non-limiting embodiment illustrated in the figures, this includes a sheet or a tubular component in a single piece or fixed, e.g. by means of screws, bolts, rivets, welding or gluing, to the first length 3c or to the base 2 or to a base.

Advantageously, the first end-of-stroke means 13 comprise a first 13a1 and a second 13a2 abutting component, e.g. a ring nut, while two abutting components or one ledge component 13b are provided for defining a first 13b1 and a second 13b2 abutting zone that are spaced from each other, such that the first abutting component 13a1 abuts against the first abutting zone 13b1 when the second length 3d is moved into the first retracted or lowered working configuration, while the second abutting component 13a2 abuts against the second abutting zone 13b2 when the second length 3d is moved into the second extended or raised working configuration. According to the non-limiting embodiment illustrated in the figures, the first 13b1 and the second 13b2 abutting zone are delimited by the ends, respectively, upper and lower of a tubular ledge component 13b.

Clearly, if both first locking-releasing means 11 and first end-of-stroke means 13 are provided, the latter define terminal positions of the second length 3d with respect to the first 3c, but it is also possible to define intermediate positions by suitably actuating by means of the first locking-releasing means.

Preferably, the first arm 4 comprises a second telescopic unit with two or more sections slidably mounted one inside the other or one alongside the other and fixable in multiple relative positions. For such purpose, if desired, the first arm 4 includes a first section 4c and a second section 4d, the first section 4c being slidably mounted with respect to the second section 4d and, in such case, the group includes second means for locking-releasing 14 in position the first section 4c with respect to the second section 4d, set to allow the locking in position of the first section 4c with respect to the second section 4d in at least one first shortened working arrangement and at least one second elongated working arrangement. The second locking-releasing means 14 can comprise a first base component 14a mounted or constrained on the second section 4d as well as a second engagement component, if desired with clamp or gripper or screw 14b set to constrain or release the first section 4c. The second locking-releasing means 14 could have manual actuation, and in such case they would comprise a grip 14c for controlling the movement of the second engagement component 14b, or automatic actuation by means of a suitable actuator.

The group 1a then comprises driving means, e.g. buttons or pedals P1, P2 each set to control the actuators of the group, in particular the actuation means 7 and/or, if provided, the first locking-releasing means 11. The buttons P1, P2 can all be provided on a console CN supported by a projecting arm 3e rising from the column 3, e.g. from an intermediate portion of the second upper length 3d, or one or more from a console CN and the others from a grip 3d, if desired rising from the head of the column 3. Clearly, it is also possible to have a remote control of the actuation means, actuators or of the other means of the group 1a, e.g. by means of remote control unit, computer, tablet, cell phone, etcetera.

With a group 1a according to the present invention, in order to release a first bead T1 of a tyre from a respective first edge W1 of a rim W, after having arranged a wheel on support and constrain means, the tool-supporting arm 4 is moved, lifting it-lowering it with the column 3 and/or angularly moving it with respect to the column 3, so as to bring the first bead releasing and/or thrust tool 5 close to a contact zone between the bead T1 of the tyre T and the edge W1 of the rim W. At this point, the actuation means 7 are driven, in a manner such to move the tool-supporting arm 4 between a first resting trim (see FIG. 6) and a second working trim (see FIG. 7), such that the bead releasing and/or thrust tool 5 is moved between a first resting or working position (see FIG. 6) and a second working position (see FIG. 7), and in such second position the bead releasing tool 5 is inserted between a portion of a first bead T1, e.g. upper during use, of tyre T and a portion of a respective first edge W1, e.g. upper during use, of a rim W.

If it is deemed that the second working position of the tool is not correct, then one operates (manually or by means of suitable actuator) on the first adjusting means 8 until the desired second working position is obtained. As will be understood, the presence of the adjusting means ensures that after having dismounted a first wheel, each subsequent wheel to be dismounted with size corresponding to that of the first wheel can be correctly dismounted without having to operate on the adjusting means 8.

This also holds true for a step of thrusting during mounting by means of the group 1a.

Still with reference to FIGS. 1 to 7 as well as to FIGS. 8 to 12, a second group 1b for bead releasing a tyred wheel and/or for thrusting a portion of a tyre of a tyred wheel is illustrated that is similar to the above-described first group 1a.

According to the non-limiting embodiment illustrated in the figures, the second group 1b comprises a base 20, a supporting column or second column 30 rising from the base 20, a tool-supporting arm or second tool-supporting arm 40 extending from the supporting column 30 as well as a bead releasing and/or thrust tool or second bead releasing and/or thrust tool 50 supported by the tool-supporting arm 40.

In addition, the second column 30 is movably mounted on the base 20 and/or the second tool-supporting arm 40 is movably mounted on the second column 30.

The group 1b also comprises actuation means or second actuation means 70 set to move the column 30 with respect to the base 20 or the tool-supporting arm 40 or a segment thereof with respect to the supporting column 30 or to another segment thereof, in a manner such to move the tool-supporting arm 40 between a first resting trim (see FIG. 8 or 11) and a second working trim (see FIG. 9 or 12), such that the bead releasing and/or thrust tool 50 is moved between a first resting position or first working position (see FIG. 8 or 11) and a second working position (see FIG. 9 or 12), and in such second position the bead releasing tool 50 is inserted or deeply inserted between a portion of a second bead T2, e.g. lower during use, of tyre T and a portion of a respective second edge W2, e.g. lower during use, of a rim W.

In addition, the tool 50 can have second working or operating side 50b, i.e. the portion which, during use, and each time and during the rotation of the roller 50, comes into contact with a portion of the bead of the tyre, preferably directed upward.

The tool 50 can be a bead releasing roller, usually frustoconical, mounted rotatably idle or motorized around an axis substantially transverse to the longitudinal extension of the respective arm 40.

Figure 9:
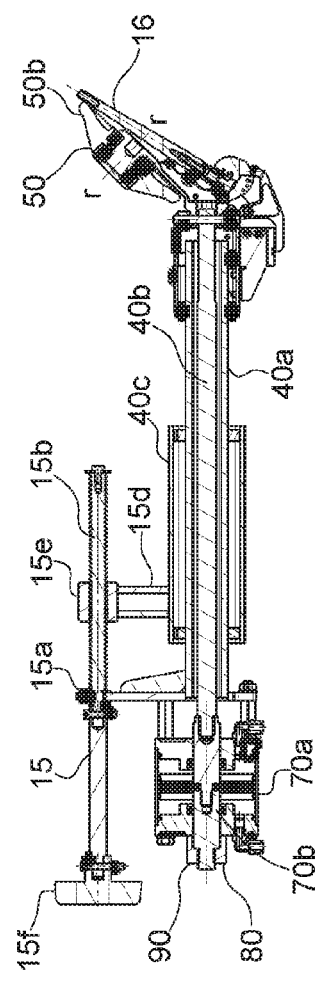
Figure 10:
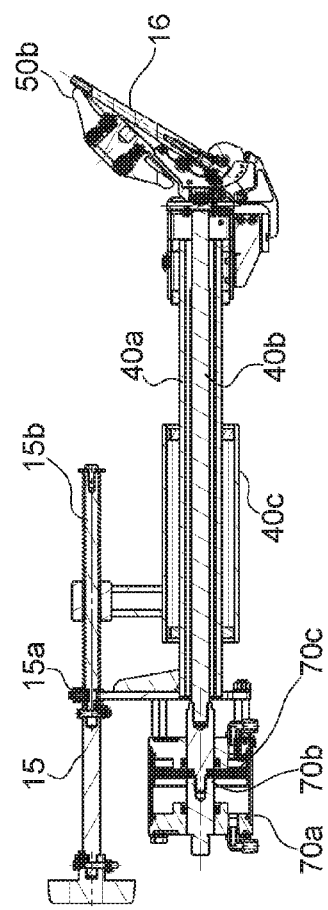
Figure 12:
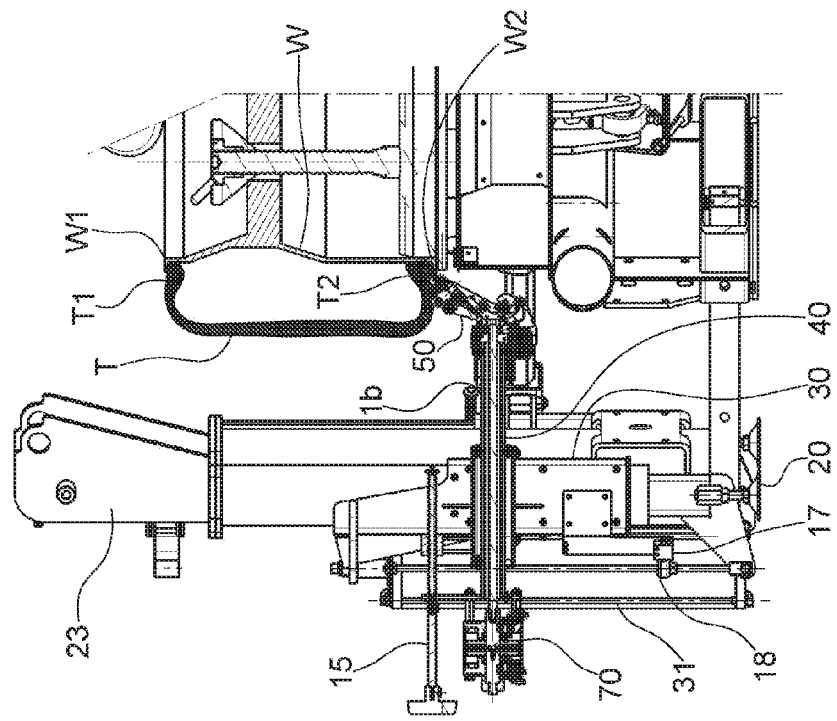
FIGS. 11 and 12 illustrate respective steps for releasing a lower bead, lower during use, of a tyre of a tyred wheel with a group according to the present invention similar to one of those illustrated of FIG. 1.
Figure 11:
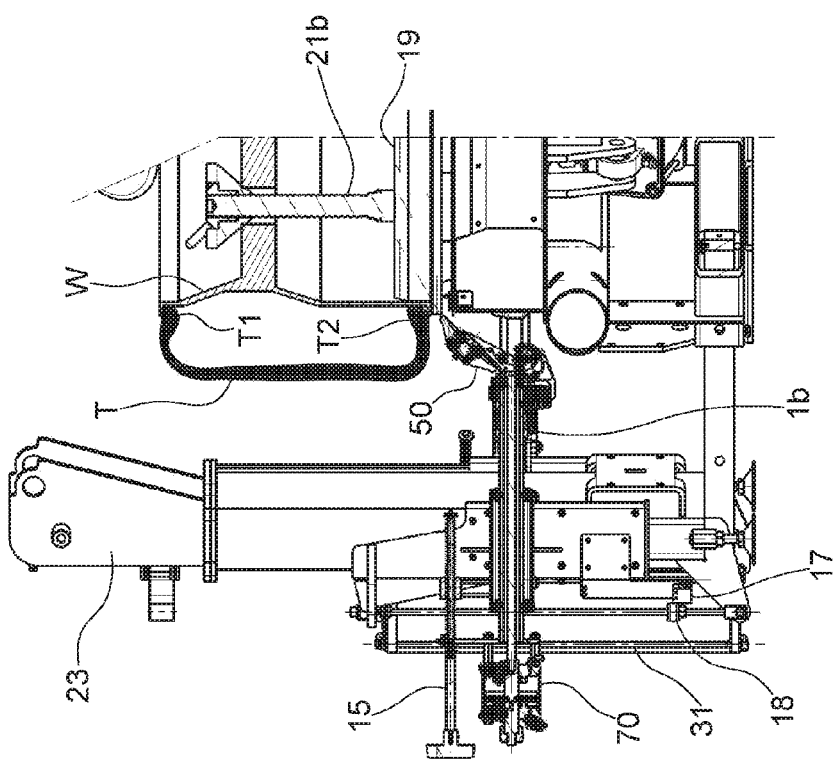

The group is then provided with adjusting means or second means for adjusting or increasing and decreasing 80 the advancing stroke of the second tool-supporting arm 40 or of a segment thereof between a first and a second working trim, set to adjustably vary the placement of the tool 50 in the second working position (see FIG. 9 or 12). The second adjusting means 80 can have automatic or manual actuation.

Preferably, the second adjusting means 80 include a locking or stopping component 90 set to abut against the second column 30, against the second arm 40 or against a component integral with or fixed thereto, when the second arm 40 or a segment thereof is moved into the second working trim.

According to the non-limiting embodiment illustrated in the figures, the second arm 40 comprises a third telescopic unit with a first segment 40a and a second segment 40b slidably mounted, if desired internally, with respect to the first segment 40a, while the locking or stopping component comprises a second stopping component 90 connected, fixed or integral with the first 40a or the second segment 40b and set to abut against the other from among the second 40b and first 40a segment or with a component of the group connected, fixed or integral with such segment, when the second arm 40 is moved into the second working trim. In such case, clearly, the tool 50 is mounted and supported, if desired by means of suitable connection components, such as brackets or the like, on a first end of the second segment 40b, if desired configured as a stem.

According to such variant, the second locking or stopping component 90 is movable and removably lockable in:

at least one first back positioning, in which the locking or stopping component 90 sets or determines at least one first advancing stroke of the second segment 40b with respect to the first segment 40a and then sets or determines at least one first placement of the tool 50 in the second working position, and at least one second advanced positioning, in which the locking or stopping component 90 sets or determines at least one second advancing stroke of the second segment 40b with respect to the first segment 40a and then sets or determines at least one second placement of the tool 50 in the second working position.

The second actuation means could comprise a third actuator 70, e.g. hydraulic, electric or pneumatic, if desired double-acting, if desired with a cylinder 70a and a stem 70b insertable/removable in/from the cylinder 70a, with the cylinder 70a or the stem 70b fixed or pivoted to the base 20, to the column 30 or to the first segment 40a, for example around one horizontal axis, and the other from among the stem 70b and the cylinder 70a is constrained or fixed to the second segment 40b. If desired, the second segment 40b could constitute the stem or in any case an extension or prolongation of the stem 70b of the third actuator 70.

If desired, the second stopping component 90 comprises a screw component adjustably mounted in screwing engagement on an externally threaded second end, distal from the tool 50, of the second segment 40b or of the stem or integral with the stem of the third actuator 70. Alternatively, the second stopping component could also be arranged in a different position and comprise a component that can be tightened or clamped on the first or second segment selectively or at a plurality of positions of the first or of the second segment.

In addition, according to the non-limiting embodiment illustrated in the figures, the second stopping component 90 is set to abut against the cylinder 70a of the third actuator, when the second actuation means 70 are actuated.

In substance, according to the non-limiting embodiment illustrated in the figures, the third actuator 70 has a cylinder 70a delimiting a chamber in which a stem 70b is slidably mounted and composed of one or more shank parts connected together and constrained on a piston plate 70c slidably mounted within the chamber delimited by the cylinder 70a and if desired set to separate the chamber delimited by the cylinder into two half-chambers. One of such shank parts of the stem 70b also projects outside the cylinder 70a and defines a constraining or mounting section of the stopping component 90. Hence by driving the dispensing of a pressurized fluid, for example air, within the cylinder 70a and into a chamber or half-chamber thereof distal from the tool 50, one determines the movement of the piston plate 70c in the direction of the tool 50 and hence of the stem 70b, thus bringing the stopping component 90 to abut against an external surface of the cylinder 70a.

According to the non-limiting embodiment illustrated in the figures, by driving the screwing of the stopping component 90, the advancing stroke of the arm 40 or better yet of the second segment 40b thereof is reduced, while by unscrewing all or part of the stopping component 90, the advancing stroke of the arm 40 or better yet of the second segment 40b thereof is increased.

Advantageously, the second arm 40 also comprises a third segment 40c connected or fixed to the second column 30, with the first segment 40a being slidably mounted within or with respect to the third segment 40c. In such case, the second group 1b also comprises means 15 for setting the relative position of the first segment 40a with respect to the third segment 40c.

Preferably, the setting means 15 include a first externally or internally threaded component 15a that is integral with or fixed to the first segment 40a and a second internally or externally threaded component 15b that is integral with or fixed to the third segment 40c and set to engage, via screwing, the first externally or internally threaded component 15a. The setting means 15 are arranged for setting the position of the arm or in any case of the first 40a and second 40b segment of the second bead releasing and/or thrusting group 1b as a function of the diameter of the rim of a wheel or for a wheel to be treated.

According to the non-limiting embodiment illustrated in the figures, the first component 15a includes a bracket integral, fixed or connected or mounted around the first segment 40a and defining a seat for the passage and locking in position, if desired via fitting or with screws, bolts or the like, of a second rod-like component 15b. In addition, the second rod-like component 15b is rotatably mounted within the respective seat defined by the first segment 40a.

The second rod-like component 15b then has an externally threaded section in meshing engagement with an internally threaded bushing 15e supported by a rib or the like 15d rising from the third segment 40c. By driving, if desired by means of a hand-wheel 15f, the rotation of the second rod-like component 15d one determines the sliding via screwing engagement of the second rod-like component 15d with respect to the rib 15d and hence the movement of the first 40a and second 40b segment with respect to the third segment 40c.

In addition, the group can be provided with sensor means set to detect the rim W and/or the tyre T and to send, directly or by means of a program control unit, respective signals to the second actuation means 70 so as to determine the movement or advancement of the tool-supporting arm 40 between a first resting or working trim and a second working trim, more particularly the advancing of the second segment 40b with respect to the first segment 40a.

The sensor means can include a probe component 16 (see FIGS. 8 to 10) having a detection end at the working zone of the second tool 50.

Alternatively, the sensor means can include a microswitch 17 (see FIGS. 11 and 12) fixed or integral with the second column 30, which when it passes alongside or is arranged at an activation component 18 determines the actuation of the second actuation means 70 and hence the advancement of the arm 40 or of the second segment 40b thereof into the second working position.

Naturally, the actuation of the second actuation means 70 can also be determined by an operator, by means of a suitable button.

Advantageously, the second column 30 comprises a fourth telescopic unit with a third length, lower during use 30c, if desired tubular, and a fourth length, upper during use 30d, if desired tubular, slidably mounted with respect to the third length 30c, e.g. partially enclosing the third length 30c. The fourth length, upper during use 30d, could be constrained or fixed or connected to the base 20 or to another column.

In such case, the group 1b can include means for extension-retraction 31 of the fourth length 30d with respect to the third length 30c, set to drive the lifting or lowering of the fourth length 30d with respect to the third 30c.

The extension-retraction means 31 could include a fourth actuator, e.g. hydraulic, electric or pneumatic, for example substantially vertical, if desired having a cylinder 31a and a stem 31b that can be inserted/removed in/from the cylinder 31a, with the cylinder 31a or the stem 31b fixed or pivoted or connected to the fourth length 30d, for example with the stem 31b fitted in a top plate 30e constrained or fixed or connected to the fourth length 30d.

The bead releasing group 1b then comprises second driving means, e.g. buttons or pedals P3, each set to control the actuators of the group, in particular the actuation means 70 and, if provided, the extension-retraction means 31. The buttons P3 can be provided on the console CN, on a grip 3d or in another position of the machine. Clearly, there could also be a remote control, by means of remote control unit, computer, tablet, etcetera. For such purpose, the group 1b could also comprise a program control unit for automatically driving the means of the group and if desired receiving and processing signals of detection means or sensor means.

With a group 1b according to the present invention, for bead release of a second bead T2 of a tyre from a respective second edge W2 of a rim W, after having arranged the wheel on support and constrain means, the tool-supporting arm 40 is moved, lifting it-lowering it with the column 30 and/or angularly moving it with respect to the column 30, so as to bring the second bead releasing and/or thrust tool 50 close to the contact zone between the bead T2 of the tyre and the respective edge W2 of the rim W.

At this point, first the movement of the second arm 40 is driven parallel to the symmetry axis, if desired rotation and symmetry axis x-x of a rim W and of a wheel TW, thus bringing the tool 50 in engagement against a portion of the bead T2 in the first working position with the arm 40 in the first working trim and then, once the sensor means 16, 17 detect the position of the edge W2 of the rim or when an operator deems that the group or better yet the tool 50 is arranged in a suitable position, the second actuation means 70 are driven (by control unit or by an operator) so as to move the second segment 40b into the second working trim, e.g. about 10-20 mm along an axis substantially parallel to the extension axis of the second segment 40b, if desired transverse or orthogonal to the symmetry axis x-x, such that the tool 50 is brought into the second working position.

If it is deemed that the attained second working position of the tool is not correct, then one operates (manually or by means of a suitable actuator) on the second adjusting means 80 until the desired second working position is obtained. As will be understood, the presence of the adjusting means will ensure that after having dismounted a first wheel, every subsequent wheel to be dismounted with size corresponding to that of the first wheel can be correctly dismounted without having to intervene on the adjusting means 80.

A machine 19 according to the present invention comprises a group for bead releasing a tyred wheel and/or for thrusting a portion of a tyre of a tyred wheel 1a and/or 1b as well as support and constrain means 21 for a rim W of or for a tyred wheel TW set to support a rim W or a tyred wheel TW with symmetry axis, if desired rotation and symmetry axis x-x, e.g. vertical or slightly tilted (by about 10-30°) with respect to the vertical. According to a less preferred variant, the symmetry axis x-x is substantially horizontal.

The support and constrain means of a machine according to the present invention can comprise a wheel-supporting table 21a, on which a rim W can be arranged of or for a tyred wheel TW. The support and constrain means can then have a second rod 21b, if desired externally threaded, rising upward starting from an intermediate portion of the table 21a and intended to be inserted in the axial hole of a rim W. In addition, a so-called "centering" cone 21c is fittable on the rod 21b for the support and constrain means, and if desired such cone is hollow, for example internally threaded. The rim W is then clamped between the table 21a and centering cone 21c by driving the screwing or the clamping of the cone 21c on the second rod.

In such case, the circumferential edge W2, if desired, lower during use, of the rim W would lie on the wheel-supporting table 21a.

Figure 16:
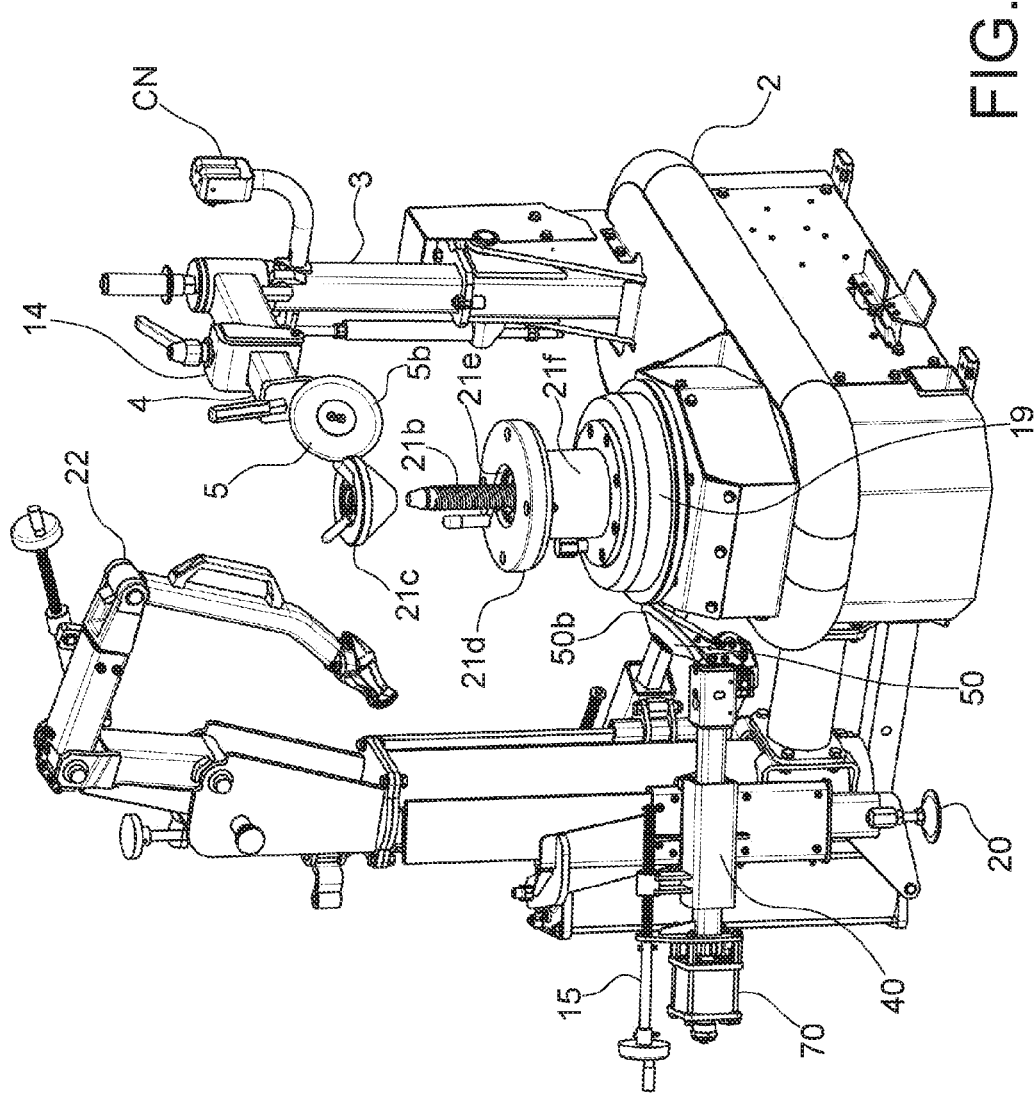
FIG. 16 is a view similar to FIG. 1 of another embodiment of a machine according to the present invention.

For such purpose, see FIG. 16, the support and constrain means could comprise a wheel-supporting table 21d on which a rim W can be arranged of or for a tyred wheel TW, which is then clamped by means of a suitable component of the support and constrain means, such as a centering cone 21c fittable on a second rod 21b mounted within a hole 21e obtained in the table 21d, and then the rim W is clamped between the table 21d and the centering cone 21c. In such case, an intermediate flange of the rim W and not the circumferential edge W2 of the rim W would lie on the wheel-supporting table 21c.

Support and constrain means of another suitable type could also be provided.

The table 21a or 21d can for example be supported by the base 2 or 20 or another base or by a pillar 21f, if desired rising from the base 2 or 20. Alternatively, the machine or better yet the support and constrain means and the groups 1a, 1b (along with those described hereinbelow) could be separated, and in such case the groups 1a, 1b could be supported by a base thereof and, when necessary, be associated or fit close to a tyre mounting-dismounting machine complete with support and constrain means.

The support and constrain means, in particular the wheel-supporting table 21a or 21d, could be motorized, by means of an electric motor, pneumatic motor or another motor type, and rotatable so to be able to rotate a rim W or a tyred wheel TW mounted thereon around a second rotation axis x-x, which, during use, corresponds with the symmetry and rotation axis x-x of the rim W. Alternatively, the support means could be fixed, and in such case one or more groups or better yet the base thereof could be rotatable or mounted on wheels, such that it would be possible to drive the group around the rim or the wheel mounted on the support and constrain means.

In addition, the support and constrain means could be movable, for example liftable-lowerable and/or horizontally translatable. This could be useful for vertically and/or horizontally approaching-moving away the support and constrain means with respect to the tool or tools of a group or of a machine according to the present invention.

Such symmetry and rotation axis x-x is substantially parallel to the main extension axis of the first 3 and/or second 30 column.

If desired, the symmetry and rotation axis x-x is substantially transverse or orthogonal to the main extension axis of the first 4 and/or second 40 arm.

For such purpose, the first column 3 and the first arm 4 could be angularly moved as indicated above, but the same preferably have extension axes that respectively remain, at least in work condition, substantially parallel and transverse or orthogonal to the symmetry and rotation axis x-x.

If a machine according to the present invention comprises a first bead releasing and/or thrusting group 1a and a second bead releasing and/or thrusting group 1b then, preferably, the second working or operating side 50b is opposite the first working or operating side 5*b*, such that the first bead releasing and/or thrusting group 1*a* is set to release a first bead T1, if desired upper, of a tyre and the second bead releasing and/or thrusting group 1*b* is set to release the other or second bead T2, if desired lower, of a tyre.

If desired, the machine 19 comprises a group 22 for mounting a tyred wheel, such mounting group including a supporting upright or third supporting column 23 rising from the base 2, 20 or from another base, a third tool-supporting arm 24 extending from the supporting upright 23, a mounting tool 25 supported by the third tool-supporting arm 24. The third tool-supporting arm 24 is pivoted to the third supporting column 23 around a third pin 23*a* such that the third tool-supporting arm 24 is movable between a first overturned or rest condition and a second work condition and the machine 19 comprises means for regulating 26 the relative arrangement or tilt or the angular position of the third arm 24 and hence of the mounting tool 25 with respect to the upright 23 in the second working condition.

According to the non-limiting embodiment illustrated in the figures, the regulating means 26 comprise a bush 26*a*, if desired internally threaded, connected or fixed, e.g. welded to the third arm 24, as well as an abutment component, e.g. tubular 26*b* constrained or fixed or connected to the supporting upright or third supporting column 23 or to a bracket 26*c* integral, fixed or connected thereto. The regulating means 26 then comprise a screw 26*d*, if desired drivable by means of a second hand-wheel 26*e*, mounted with screwing engagement within the bush 26*a*, and a portion or tip thereof is set to abut against the abutment component 26*b*. With one such structure, by driving the screwing and unscrewing of the screw 26*d* with respect to the bush 26*a*, the latter presses against the abutment component 26*b*, varying the tilt of the third arm 24 with respect to the upright 23.

If desired, an extension or stem component 25*a* can be provided, on one side connected or better yet articulated or pivoted, around a pin 25*b*, to the third arm 24 or to a fork component 24*b* mounted at one end thereof, and on the other side bearing the mounting tool 25, which is fixed to the extension or stem component 25*a*.

Advantageously, the mounting tool 25, if desired with interposition of the extension or stem component 25*a*, is articulated or pivoted to the respective third arm 24 in a manner such that it is angularly movable, during use or during the mounting and/or dismounting of a tyre T on/from a rim W, with respect to the third arm 24 due to the force of reaction imparted to the mounting tool 25 by a rim W and/or tyre T of the tyred wheel TW.

A mounting tool according to the present invention could for example be as described in the European patent applications EP2524821A1, EP1714807A1 or EP2875969A1, all in the name of the applicant of the present patent application.

The mounting tool can also be of a different type, e.g. driven or drivable by means of actuators during mounting.

Preferably, a column of a machine according to the present invention, for example the first, the second and/or the third column can approach-move away from the support and constrain means 21 or better yet from the base 2 thereof between a transport and storage approached configuration (see FIGS. 13 to 15) and a distanced working configuration (see FIGS. 1 to 4). In such case, the machine comprises means 27 for fixing or constraining the column in position in the distanced working configuration. If desired, the fixing in position means comprise a sleeve 27 fixable on one side to the support and constrain means 21 or better yet to the base 2 and on the other side to such column 3, 30, 23. In such case, the machine 19 can also comprise guide means 27*a* for guiding the relative movement of the column with respect to the base 20 or with respect to the support and constrain means 21. The guide means 27*a* can comprise a rod-like slide fixed to the first, to the second and/or to the third column or to the support and constrain means 21 or to the base 2, as well as a track formed or delimited by the other among support and constrain means 21 and the first, the second and/or the third column in which the rod-like slide is slidably mounted.

In accordance with the present invention, a machine is also provided for mounting and/or dismounting a tyre T on/from a rim W comprising:

at least one base 2, 20, a group for bead releasing a tyred wheel and for thrusting a portion of a tyre of a tyred wheel, and such bead releasing and thrusting group includes a first supporting column 3 rising from the base 2, a first tool-supporting arm 4 extending from the first supporting column 3 as well as a bead releasing and/or thrust tool 5 supported by the tool-supporting arm 4, a mounting group for a tyred wheel TW, and such mounting group 22 includes a supporting upright 23 rising from the or from a base, a third tool-supporting arm 24 extending from the supporting upright 23, a mounting tool 25 supported by the third tool-supporting arm 24, the mounting tool 25 having working or operating side 25*a* directed in the same direction as the bead releasing and/or thrust tool 5, such that such tools 5, 25 are set to simultaneously operate on the same circumferential bead of a tyre, support and constrain means 19 for a rim W of or for a tyred wheel TW set to support a rim W or a tyred wheel TW with symmetry and rotation axis x-x, The first column 4 is also angularly offset with respect to the third column 23 around the symmetry and rotation axis x-x by an angle between 30° and 120°, preferably between 60° and 100°, still more preferably equal to 90°, with reference to a plane substantially orthogonal to the symmetry and rotation axis x-x, such that the thrust group 1*a* and the mounting group 22 are set to simultaneously operate on the same circumferential bead T1, e.g. upper, of a tyre T to be mounted on a rim W at respective portions of the support and constrain means 19 or of a respective table 21*a*, 21*d* and then at a same circumferential bead T1 of the tyre angularly offset by an angle between 30° and 120° with respect to each other.

Clearly, at least during the mounting operations, the symmetry and rotation axis x-x will substantially lie along the main longitudinal extension axes of the first tool-supporting arm 4 and of the third tool-supporting arm 24 or in any case such arms 4, 24 or better yet the respective tools 5, 25 will be directed towards the support and constrain means 19, and hence substantially radial with respect to the axis x-x.

If desired, in such case:

the bead releasing group is the above-described group 1*a*, the mounting group is the above-described group 22.

The applicant of the present patent application has verified that the arrangement of the columns with an angular offset as indicated above allows attaining the mounting of a circumferential bead of a tyre in a quicker and more correct manner than the machines proposed up to now.

For such purpose, during mounting, a mounting tool, for example the mounting tool 25, operates on a first bead of a tyre by grasping a portion thereof and driving it within the channel C of the rim W, i.e. into the zone delimited between two circumferential edges W1, W2 of the rim W. Simultaneously therewith, the thrust tool 5 operates and presses on a portion of the first bead T1 that is angularly spaced from the operation zone of the mounting tool and assists such mounting tool in guiding the first circumferential bead T1 within the channel C of the rim W. The mutual position of the columns and hence of the respective arms and tools ensures that the action of the thrust tool is suitable and hence not too close nor too far from the mounting tool.

In addition, a column, in particular the third column or upright 23, could be used as a tank of pressurized fluid, such as air, containing about 10-30 liters, e.g. about 20 liters, for supplying the pneumatic movement actuators for the components of a group or of the machine according to the present invention. Clearly, another pressurized air or fluid source could be provided for, for example a bomb or another source.

A machine according to the present invention could also comprise a fourth tool-supporting arm 28 extending from a column of the machine, for example from the third supporting column 23 on the side opposite the second bead releasing group with respect to the third column 23, as well as a second mounting tool 29 supported by the fourth tool-supporting arm 28.

The fourth tool-supporting arm 28 could be like the second tool-supporting arm 40 and setting means could then be provided that are similar to the setting means 15 set to operate on the fourth tool-supporting arm 28.

Such second mounting tool could have a foil extended upward and tilted starting from the fourth arm 28, for example at about 90° with respect to the main longitudinal axis of the fourth arm 28.

In addition, the fourth tool-supporting arm 28 could be movably mounted on the upright or third column 23, e.g. slidably along a vertical axis or in any case parallel to the symmetry and rotation axis x-x of the rim W, such function being assignable to respective motor means.

A machine according to the present invention then comprises control means, e.g. buttons or pedals that are each set to control the actuators of the group. Clearly, there could also be a remote control of the actuation means, actuators or of the other means of the machine, e.g. by means of remote control, computer, tablet, mobile phone, etcetera. For such purpose, the machine could also comprise a program control unit for automatically driving the means of the machine and if desired receiving and processing signals of detection means or sensors.

As will be understood, in a group and in a machine according to the present invention, the adjusting means allow, among other things, each time establishing and setting the advancing stroke or path of a bead releasing and thrust tool during the treatment of a first wheel and then subsequently treating all the wheels with same size, without having to modify the adjusting means, this being particularly advantageous for the treatment of wheels with pressure sensors or wheels with structural characteristics such to set specific work conditions.

In addition to the new structure of the single groups in accordance with the present invention, a machine according to the present invention provides a combination of components and functions that are neither provided nor suggested by the previously-proposed solutions.

Modifications and variations of the invention are possible within the protective scope defined by the claims.

The invention claimed is:

1. A group for bead releasing a tyred wheel and/or for thrusting a portion of a tyre of a tyred wheel, which group comprises:

at least one base, at least one supporting column rising from said at least one base, at least one tool-supporting arm extending from said at least one supporting column, at least one bead releasing and/or thrust tool supported by said tool-supporting arm, said at least one column being movably mounted on said at least one base and/or said at least one tool-supporting arm being movably mounted on said at least one column, said group further comprising actuation means arranged to move said at least one column with respect to said at least one base or said at least one tool-supporting arm or a segment thereof with respect to said at least one supporting column or to another segment of said at least one tool-supporting arm, so as to move said at least one tool-supporting arm between a first resting or working trim and a second working trim, so that said at least one bead releasing and/or thrust tool is moved between a first resting or working position and a second working position, in which second position said at least one bead releasing and/or thrust tool is inserted between a portion of a bead of a tyre and a portion of a respective edge of a wheel rim, wherein said group comprises adjusting means for adjusting the advancing stroke of said at least one tool-supporting arm or of a segment thereof, between said first resting or working trim and said second working trim, designed to adjustably vary the placement of said at least one bead releasing and/or thrust tool in said second working position.

2. The group according to claim 1, wherein said adjusting means include at least one locking or stopping or buffer-like component, said at least one locking or stopping or buffer-like component being arranged to abut against said at least one column, against said at least one arm or against a component integral with or fixed to the same, when said at least one arm is moved in said second working trim or said at least one locking or stopping component is integral with said at least one column or with said at least one arm or with a segment thereof and is arranged to abut against another component of said group or against another segment of said arm, when said at least one arm or a segment thereof is moved in said second working trim, said at least one locking or stopping component being movable and releasably lockable in at least one first back positioning, wherein said at least one locking or stopping component sets or determines at least one first advancing stroke and thus at least one first placement of said tool in said second working position and at least one second advanced positioning, wherein said at least one locking or stopping component sets or determines at least one second advancing stroke, and thus at least one second placement of said at least one tool in said second working position.

3. The group according to claim 2, wherein said at least one locking or stopping component is movable and removably lockable in a plurality of operating positions, so as to set or determine in each one of said operating positions a respective advancing stroke and a respective placement of said tool, in said second working position.

4. The group according to claim 2, comprising at least one gripper or pinion or nut or annular or spline or pin component fixed or integral with said at least one base or with said at least one column as well as a sheet, rod-like or rack component mounted in engagement with or within said at least one gripper or pinion or nut or annular or spline or pin component, said at least one locking or stopping or buffer-like component being delimited by or fixed to an end of said sheet, rod-like or rack component, so that by controlling the rotation or movement or sliding of said sheet, rod-like or rack component, the movement of said at least one locking or stopping or buffer-like component is controlled between said at least one first back positioning and said at least one second advanced positioning.

5. The group according to claim 1, wherein said at least one supporting column is pivoted on said at least one base and said actuation means comprise angular movement means of said at least one column with respect to said at least one base.

6. The group according to claim 1, wherein said at least one tool-supporting arm in pivoted on said at least one supporting column, for example around a vertical axis.

7. The group according to claim 1, wherein said at least one column comprises a first telescopic unit with a first length, lower in use, and a second length, upper in use, slidably mounted with respect to said first length, said group further including first means for locking-releasing in position said first length with respect to said second length designed to allow the locking in position of said second length with respect to said first length in at least one retracted or lowered first working configuration and in at least one extended or raised second working configuration.

8. The group according to claim 1, wherein said at least one column comprises a first telescopic unit with a first length, lower in use, and a second length upper in use, slidably mounted with respect to said first length, said group further comprising first end-of-stroke means of the movement of said second length with respect to said first length arranged to define the level or height or extension with respect to said first length of said second length in the first retracted or lowered working configuration and/or in the at least one second extended or raised working configuration.

9. The group according to claim 8, wherein said first end-of-stroke means comprise at least one abutting component fixed to or integral with said second length, at least one ledge component fixed to or integral with said first length and designed to abut against said at least one abutting means when said second length is moved in the first retracted or lowered working configuration or in the extended or raised second working configuration.

10. The group according to claim 9, wherein said first end-of-stroke means comprise a threaded rod fixed or constrained to or integral with said second length or said first length, while said at least one abutting component or said at least one ledge component comprises at least one internally threaded ring nut screwing engageably mounted on said threaded rod or said first end-of-stroke means comprise one rod fixed or constrained to or integral with said second length or said first length, on which said at least one abutting or said at least one ledge component is clamped or removably constrained.

11. The group according to claim 1, wherein said at least one arm comprises a second telescopic unit with two or more sections slidably mounted one inside the other or side by side and fixable in a plurality of relative positions, said slidably mounted sections including a first section and a second section slidably mounted with respect to said first section, said group further including second means for locking-releasing in position said first section with respect to said second section, designed to allow the locking in position of said first section with respect to said second section in at least one retracted first working arrangement and at least one extended second working arrangement.

12. The group according to claim 1, comprising sensor means designed to detect the wheel rim and/or the tyre and to send directly or through a program control unit respective signals to said actuation means so as to determine the movement or advancement of said tool-supporting arm or a segment thereof between a first resting or working trim and a second working trim.

13. The group according to claim 2, wherein said at least one arm comprises a third telescopic unit with a first segment and a second segment slidably mounted with respect to said first segment ad wherein said locking or stopping component comprises at least one second locking or stopping component connected, fixed or integral with said first or said second segment and designed to abut against the other among said second and said first segment or with one component of said group connected, fixed or integral with said segment, when said at least one arm or said second segment is moved in said second working trim, said at least one tool being mounted on said first end of said second segment,
    said at least one second locking or stopping component being movable and removably lockable in
    at least one first back positioning, wherein said locking or stopping component sets or determines at least one first advancing stroke of said second segment with respect to said first segment and, thus, it sets or determines at least one first location of said tool in said second working position, and
    at least one second advanced positioning, wherein said locking or stopping component sets or determines at least one second advancing stroke of said second segment with respect to said first segment, and, thus, it sets or determines at least one second location of said tool in said second working position.

14. The group according to claim 13, wherein said at least one second locking component comprises at least one screw component adjustably mounted in engagement on a second end of said second segment or the stem or integrally with the stem of said actuation means, or said at least one locking component comprises a component which can be tightened or clamped on said first or second segment, selectively or at a plurality of positions of said first or second segment.

15. The group according to claim 13, wherein said at least one arm comprises a third segment connected or fixed to said column, said first segment being slidably mounted inside or with respect to the third segment, said group further comprising setting means of the relative position of said first segment with respect to said third segment.

16. The group according to claim 15, wherein said setting means include an externally or internally threaded first component integral with or fixed to said first segment and an internally or externally threaded second component integral with or fixed to said third segment and designed to engage by screwing said externally or internally threaded first component.

17. A machine for mounting and/or dismounting a tyre on/from a wheel rim, comprising at least one base,
    at least one group for bead releasing a tyred wheel and for thrusting a portion of a tyre of a tyred wheel, which first group for bead releasing and thrusting includes at least one first supporting column rising from said at least one base, at least one first tool-supporting arm extending from said at least one first supporting column, at least one bead releasing and thrust tool supported by said at least one tool-supporting arm, at least one group for mounting a tyred wheel, which group for mounting includes at least one supporting upright rising from said at least one base, at least one third tool-supporting arm extending from said at least one supporting upright, at least one mounting tool supported by said at least one third tool-supporting arm, said at least one mounting tool having a working or operating side facing the same direction of said at least one bead releasing and thrust tool, so that said at least one bead releasing and thrust tool and said at least one mounting tool are designed to act simultaneously on the same circumferential bead of a tyre, and support and constrain means of a wheel rim of or for a tyred wheel set to support a wheel rim or a tyred wheel with rotation and symmetry axis, wherein said first column is angularly offset with respect to said upright around said rotation and symmetry axis by an angle between 60° and 100° with reference to a plane substantially orthogonal to the rotation and symmetry axis, so that said group for bead releasing and thrusting and said group for mounting are set to simultaneously operate on the same circumferential bead of a tyre to be mounted on a wheel rim, at respective portions of the support and constrain means and, thus, of a same circumferential bead of the tyre angularly offset for an angle between 60° and 100° with respect to one another.

18. The machine according to claim 17, wherein said first column or said upright is approachable-moveable apart to/from said support and constrain means between a transport and storage approached configuration and a distanced working configuration, and wherein said machine comprises means for fixing or constraining in position said first or said third column in said distanced working configuration.

19. The machine comprising at least one group for bead releasing a tyred wheel and/or for thrusting a portion of a tyre of a tyred wheel according to claim 1, as well as support and constrain means of a wheel rim of or for a tyred wheel, designed to support a wheel rim or a tyred wheel with rotation and symmetry axis.

20. The machine according to claim 19, wherein said column can be approached-moved apart to/from said support and constrain means between a transport and storage approached configuration and a distanced working configuration and wherein said machine comprises means for fixing or constraining in position said first column in said distanced working configuration.

21. The machine according to claim 18, wherein said means for fixing or constraining comprise a sleeve fixable on one side to said fixing or constraining means and, on the other, to said column or post.

22. The machine according to claim 20, wherein said means for fixing or constraining comprise a sleeve fixable on one side to said fixing or constraining means and, on the other, to said column or post.

23. The machine according to claim 17, comprising a group for mounting a tyred wheel, including a third supporting column rising from a base, a third tool-supporting arm extending from said third supporting column, a mounting tool supported by said third tool-supporting arm, said third tool-supporting arm being pivoted on said third supporting column around a third pin, so that said third tool-supporting arm is movable between a first overturned or resting state and a second working state, and wherein said machine comprises means for regulating the relative arrangement or the tilt or the angular position of said third arm and, thus, of said mounting tool with respect to said third column in the second working state.

24. The machine according to claim 19, comprising a group for mounting a tyred wheel, including a third supporting column rising from a base, a third tool-supporting arm extending from said third supporting column, a mounting tool supported by said third tool-supporting arm, said third tool-supporting arm being pivoted on said third supporting column around a third pin, so that said third tool-supporting arm is movable between a first overturned or resting state and a second working state, and wherein said machine comprises means for regulating the relative arrangement or the tilt or the angular position of said third arm and, thus, of said mounting tool with respect to said third column in the second working state.

25. The machine according to claim 19, comprising a first group for bead releasing and/or thrusting and a second group for bead releasing and/or thrusting, said first group for bead releasing and/or thrusting having bead releasing and/or thrust tool with a first working or operating side, that is the portion that, in use, goes into contact with a portion of a respective bead of the tyre, while said second group for bead releasing and/or thrusting has bead releasing and/or thrust tool with second working or operating side opposed to said first working or operating side, so that said first group for bead releasing and/or thrusting is designed to bead release a first bead of a tyre and said second group for bead releasing and/or thrusting is designed to bead release a second bead of a tyre.

* * * * *